United States Patent
Wurth et al.

(10) Patent No.: US 9,816,796 B2
(45) Date of Patent: Nov. 14, 2017

(54) GUIDE RAIL STRAIGHTNESS TESTER

(71) Applicant: Wurtec, Incorporated, Toledo, OH (US)

(72) Inventors: Steven P. Wurth, Sylvania, OH (US); Terry Rodebaugh, Whitehouse, OH (US); Douglas Scott, Grosse Ile, MI (US)

(73) Assignee: Wurtec, Incorporated, Toledo, OH (US)

( * ) Notice: Subject to any disclaimer, the term of this patent is extended or adjusted under 35 U.S.C. 154(b) by 299 days.

(21) Appl. No.: 14/877,162

(22) Filed: Oct. 7, 2015

(65) Prior Publication Data
US 2016/0102962 A1 Apr. 14, 2016

Related U.S. Application Data

(60) Provisional application No. 62/061,910, filed on Oct. 9, 2014.

(51) Int. Cl.
*G01B 5/20* (2006.01)

(52) U.S. Cl.
CPC ..................... *G01B 5/20* (2013.01)

(58) Field of Classification Search
CPC ....... G01B 5/20; B66B 19/002; B66B 19/007; B66B 7/1246; G01C 15/10
USPC .......................................................... 33/533
See application file for complete search history.

(56) References Cited

U.S. PATENT DOCUMENTS

| | | | |
|---|---|---|---|
| 9,718,643 B2* | 8/2017 | van der Meijden | B66B 7/02 |
| 2014/0138189 A1* | 5/2014 | van der Meijden | B66B 7/02 |
| | | | 187/406 |
| 2015/0226536 A1* | 8/2015 | Huang | G01B 5/285 |
| | | | 33/533 |
| 2016/0102962 A1* | 4/2016 | Wurth | G01B 5/20 |
| | | | 33/533 |
| 2016/0311648 A1* | 10/2016 | Vaarala | B66B 5/00 |
| 2016/0311657 A1* | 10/2016 | Kilpelainen | B66B 19/00 |
| 2016/0311658 A1* | 10/2016 | Kilpelainen | B66B 7/023 |
| 2016/0325968 A1* | 11/2016 | Baker | B66B 19/002 |

FOREIGN PATENT DOCUMENTS

| | | |
|---|---|---|
| CN | 101319869 A | 12/2008 |
| CN | 201199147 Y | 2/2009 |
| CN | 101614531 A | 12/2009 |
| CN | 201548211 U | 8/2010 |
| CN | 202562451 U | 11/2012 |
| CN | 103017690 A | 4/2013 |

(Continued)

*Primary Examiner* — Yaritza Guadalupe-McCall
(74) *Attorney, Agent, or Firm* — MacMillan, Sobanski & Todd, LLC

(57) ABSTRACT

A guide rail straightness tester is provided. The guide rail straightness tester includes a first rail clamp assembly attached to a guide rail. An opposing second rail clamp assembly is attached to the guide rail. A sensor assembly is positioned between the first and second rail clamp assemblies and configured for slidable seating on the guide rail. The sensor assembly includes a sensor plate. A line extends from the first rail clamp assembly through an aperture in the sensor plate and is connected to the second rail clamp assembly. The sensor assembly is configured to determine the straightness of the guide rail during movement of the sensor assembly along the guide rail.

20 Claims, 8 Drawing Sheets

(56) References Cited

FOREIGN PATENT DOCUMENTS

| | | |
|---|---|---|
| CN | 103033161 A | 4/2013 |
| CN | 203140492 U | 8/2013 |
| CN | 203144855 U | 8/2013 |
| CN | 103308006 A | 9/2013 |
| CN | 103616005 A | 3/2014 |
| CN | 203541170 U | 4/2014 |
| CN | 203541171 U | 4/2014 |
| CN | 203550920 U | 4/2014 |
| CN | 203550939 U | 4/2014 |
| CN | 203981159 U | 12/2014 |
| CN | 104515480 A | 4/2015 |
| EP | 0498051 A2 | 8/1992 |

* cited by examiner

GUIDE RAIL STRAIGHTNESS TESTER

RELATED APPLICATIONS

This application claims the benefit of U.S. Provisional Patent Application No. 62/061,910, filed Oct. 9, 2014, the disclosure of which is incorporated herein by reference in its entirety.

BACKGROUND

Guide rails are means for guidance of an elevator car and/or a counterweight within an elevator shaft. Guide rails are formed from individual guide rail elements, stacked in a mating fashion on top of each other with the stack of guide rail elements typically extending from the bottom of the shaft to the top of the elevator shaft. The guide rails enable a controlled vertical movement of the elevator car and/or a counterweight through acceptance of horizontal forces. The elevator car and/or the counterweight is connected to the guide rails by wheels or slidable components which are fastened to, for example, the sides of the elevator car or the counterweight.

In operation, proper alignment of the stack of guide rail elements contributes to smooth movement of the elevator car and/or counterweight. Conversely, improper alignment of the stack of guide rail elements can result in bumpy or uneven movement of the elevator car and/or counterweight. In still other instances, improper alignment of the stack of guide rail elements can result in vibration that can be felt by passengers riding within the elevator car.

One aspect affecting the alignment of the stack of guide rail elements is the straightness of the individual guide rail elements. Aligning a stack of guide rail elements from individual guide rail elements that are twisted or warped can be difficult and time consuming.

It would be advantageous if the straightness of individual guide rail elements could be easily tested prior to their installation.

SUMMARY

In accordance with embodiments of the invention, there is provided a guide rail straightness tester. The guide rail straightness tester includes a first rail clamp assembly attached to a guide rail. An opposing second rail clamp assembly is attached to the guide rail. A sensor assembly is positioned between the first and second rail clamp assemblies and configured for slidable seating on the guide rail. The sensor assembly includes a sensor plate. A line extends from the first rail clamp assembly through an aperture in the sensor plate and is connected to the second rail clamp assembly. The sensor assembly is configured to determine the straightness of the guide rail during movement of the sensor assembly along the guide rail.

In accordance with other embodiments, there is also provided a guide rail straightness tester. The guide rail straightness tester includes a first rail clamp assembly attached to a guide rail. An opposing second rail clamp assembly is attached to the guide rail. A sensor assembly is positioned between the first and second rail clamp assemblies and configured for slidable seating on the guide rail. A line extends from the first rail clamp assembly through an aperture in the sensor assembly and is connected to the second rail clamp assembly. The second rail clamp assembly and the sensor assembly can be docked together to facilitate relocation from the guide rail to a different guide rail.

In accordance with other embodiments, there is also provided a method of using a guide rail straightness tester. The method includes the steps of attaching a first rail clamp assembly to a guide rail, attaching an opposing second rail clamp assembly to the guide rail, positioning a sensor assembly between the first and second rail clamp assemblies, the sensor assembly configured for slidable seating on the guide rail, the sensor assembly including a sensor plate and extending a line from the first rail clamp assembly through an aperture in the sensor plate and connecting the line to the second rail clamp assembly. The sensor assembly is configured to determine the straightness of the guide rail during movement of the sensor assembly along the guide rail.

Various advantages of the guide rail straightness tester will become apparent to those skilled in the art from the following detailed description, when read in light of the accompanying drawings.

BRIEF DESCRIPTION OF THE DRAWINGS

FIG. 3b is a side view, in elevation, of the conventional car guide rail element of FIG. 2 assembled to the guide rail straightness tester of FIG. 3a.

FIG. 4 is a perspective view of a first rail clamp assembly of the guide rail straightness tester of FIG. 3a.

FIG. 5 is a perspective view of a second rail clamp assembly of the guide rail straightness tester of FIG. 3a.

FIG. 6 is a perspective view of a sensor assembly of the guide rail straightness tester of FIG. 3a.

DETAILED DESCRIPTION

The guide rail straightness tester will now be described with occasional reference to the specific embodiments. The guide rail straightness tester may, however, be embodied in different forms and should not be construed as limited to the embodiments set forth herein. Rather, these embodiments are provided so that this disclosure will be thorough and complete, and will fully convey the scope of the guide rail straightness tester to those skilled in the art.

Unless otherwise defined, all technical and scientific terms used herein have the same meaning as commonly understood by one of ordinary skill in the art to which the guide rail straightness tester belongs. The terminology used in the description of the guide rail straightness tester herein is for describing particular embodiments only and is not intended to be limiting of the guide rail straightness tester. As used in the description of the guide rail straightness tester and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the guide rail straightness tester. Notwithstanding that the numerical ranges and parameters setting forth the broad scope of the guide rail straightness tester are approximations, the numerical values set forth in the specific examples are reported as precisely as possible. Any numerical values, however, inherently contain certain errors necessarily resulting from error found in their respective measurements.

In accordance with the illustrated embodiments, a guide rail straightness tester is provided. It will be understood the term "guide rail", as used herein, is defined to mean any structure forming a track for guiding an elevator car. The term "twist" as used herein, is defined to mean the torsional rotation of an individual guide rail element along a longitudinal axis. The term "warp", as used herein, is defined as the deviation of a guide rail element relative to a straight line positioned along a longitudinal axis of the guide rail element. As will be discussed in more detail below, the warp of a guide rail element can occur in different directions.

The description and figures disclose a guide rail straightness tester for testing the straightness of an individual guide rail element. The guide rail straightness tester can be configured to indicate if the individual guide rail element is within a certain straightness specification.

Figure 1:
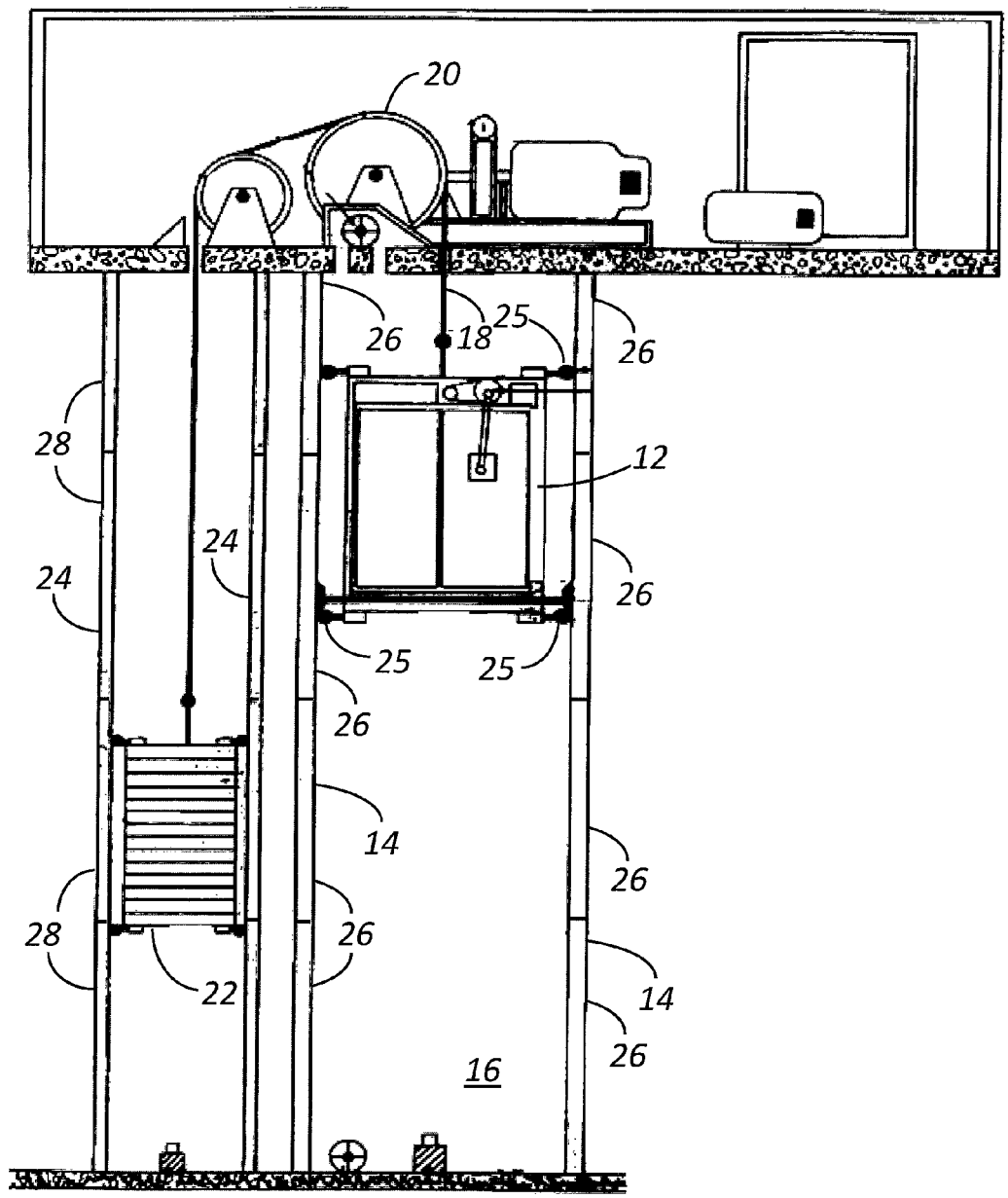
FIG. 1 is a side view, in elevation, of a conventional elevator hoistway.

Referring now to the drawings, there is illustrated in FIG. 1 a diagrammatic and simplified view of an elevator 10. The elevator 10 is conventional in the art and will only be briefly described. The elevator 10 includes an elevator car 12, moving in a substantially vertical direction within opposing car guide rail stacks 14. The opposing car guide rail stacks are disposed in the elevator hoistway 16. The elevator car 12 is supported by one end of one or more suspension elements 18, which are moved with an elevator machine 20. In certain instances, the suspension elements 18 can have the form of wire ropes. However, in other instances, the suspension elements 18 can have other forms, such as the non-limiting example of belts. The other end of the one or more suspension elements 18 is connected to a counterweight 22. The counterweight 22 moves in a substantially vertical direction within opposing counterweight guide rail stacks 24. A plurality of guide members 25 is attached to the elevator car 12. The guide members 25 will be discussed in more detail below.

Referring again to FIG. 1 each of the car guide rail stacks 14 is composed of a plurality of individual car guide rail elements 26 arranged in a stacked orientation. In a similar manner, each of the counterweight guide rail stacks 24 is composed of a plurality of individual counterweight guide rail elements 28 arranged in a stacked orientation. As discussed above, the smoothness or ride quality experienced by passengers in the elevator car 12 can be influenced by a number of factors, including the alignment of each car guide rail stack 26. One of the factors affecting the alignment of each car guide rail stack 26 is the straightness of each of the individual car guide rail elements 26.

Figure 2:
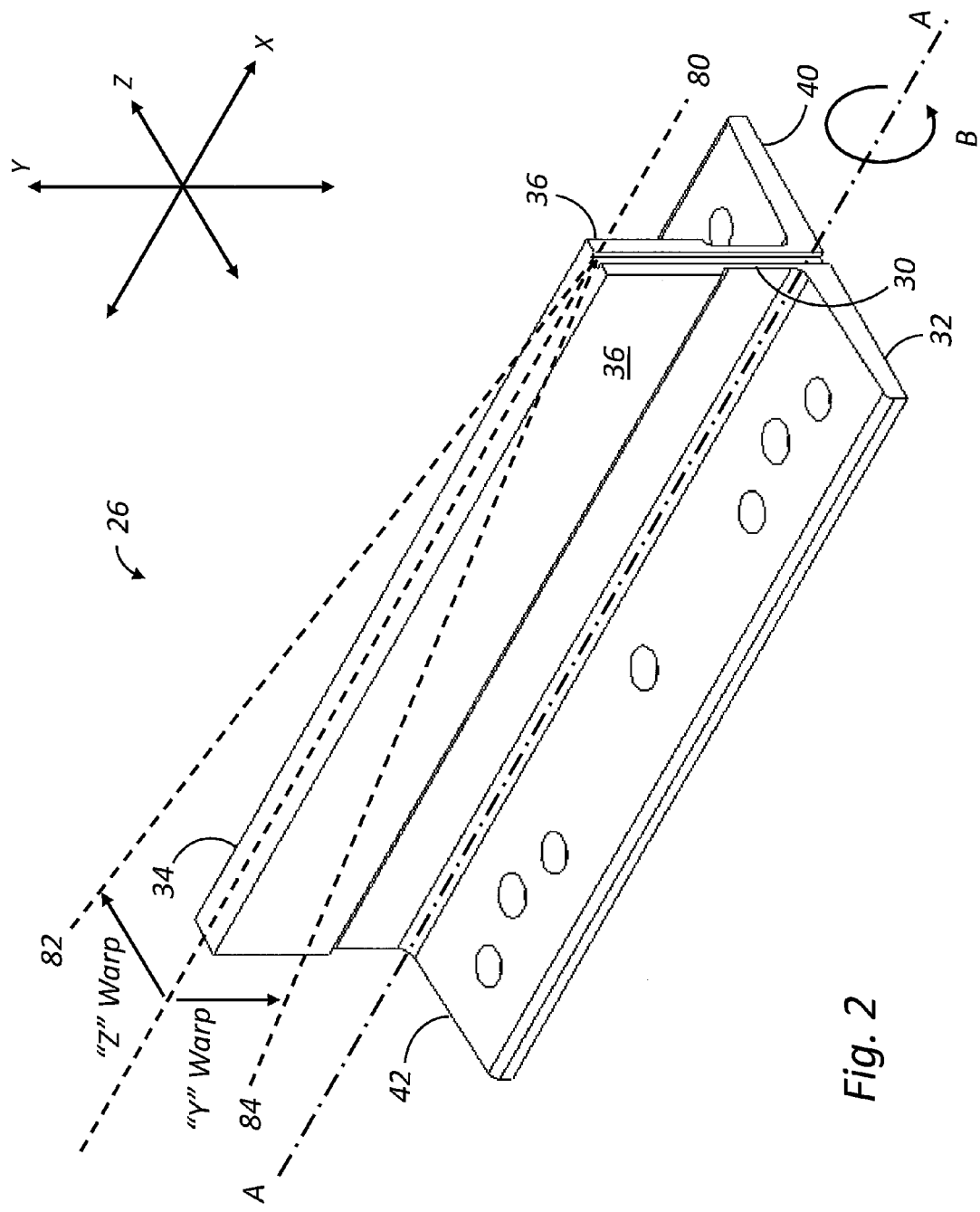
FIG. 2 is a perspective view, of a portion of a conventional car guide rail element.

Referring now to FIG. 2, a perspective view of a portion of a conventional individual car guide rail element 26 (hereafter "element" is illustrated). The element 26 has an inverted "T" cross-sectional shape and includes a flange 30 extending from a base 32. The flange 30 includes a front face 34 positioned between opposing side faces 36. In operation, guide elements 25 (as shown in FIG. 1) attached to the elevator car 12 roll or slide against the faces 34, 36 of the element 26 as the elevator car 12 moves within the hoistway 16. It is known in the art to machine the faces 34, 36 of the element 26 in order to provide smooth surfaces for the guide elements 25 to roll or slide against.

Referring again to FIG. 2, the element 26 has a first end 40, a second end 42 and a longitudinal axis A-A extending therebetween. As can be seen in FIG. 2, the longitudinal axis A-A extends in an "X" axis direction. As discussed above, one aspect affecting the alignment of the element 26 is the straightness of the elements 26. The straightness of the element 26 can be defined in two parameters. First, the straightness of the element 26 can be defined by the degree of "twist" experienced along the length of the element 26. That is, the "twist" is the degree of torsional rotation of the element 26 in a Y-Z plane along the longitudinal axis A-A as shown by direction arrow B. An excessive amount of twist could cause the guide elements 25 to improperly roll or slide against the faces 34, 36 of the element 26 as the elevator car 12 moves within the hoistway 16.

Second, the straightness of the element 26 can be defined by the degree of "warp" experienced along the length of the element 26. As discussed above, "warp" is the deviation of the element 26 about the "Y" or "Z" planes relative to a straight line positioned parallel to the longitudinal axis A-A. Warping of the element 25 can occur in different directions. Referring again to FIG. 2, imaginary line 80, parallel to longitudinal axis A-A, extends in a longitudinal direction along the front face 34 of the element 26. As a first example of directional warp, imaginary line 82 represents warp of the second end 42 of the element 26, relative to the first end 40, in a "Z" direction. As another example of directional warp, imaginary line 84 represents warp of the second end 42 of the element 26, relative to the first end 40, in a "Y" direction. While not shown in FIG. 2, it is also within the realm of possibility that the element 26 can warp in a combination of directions, such as for example, a warp in a "ZY" direction. An excessive amount of warp could cause the guide elements 25 to improperly roll or slide against the faces 34, 36 of the element 26 as the elevator car 12 moves within the hoistway 16.

Figure 3A:
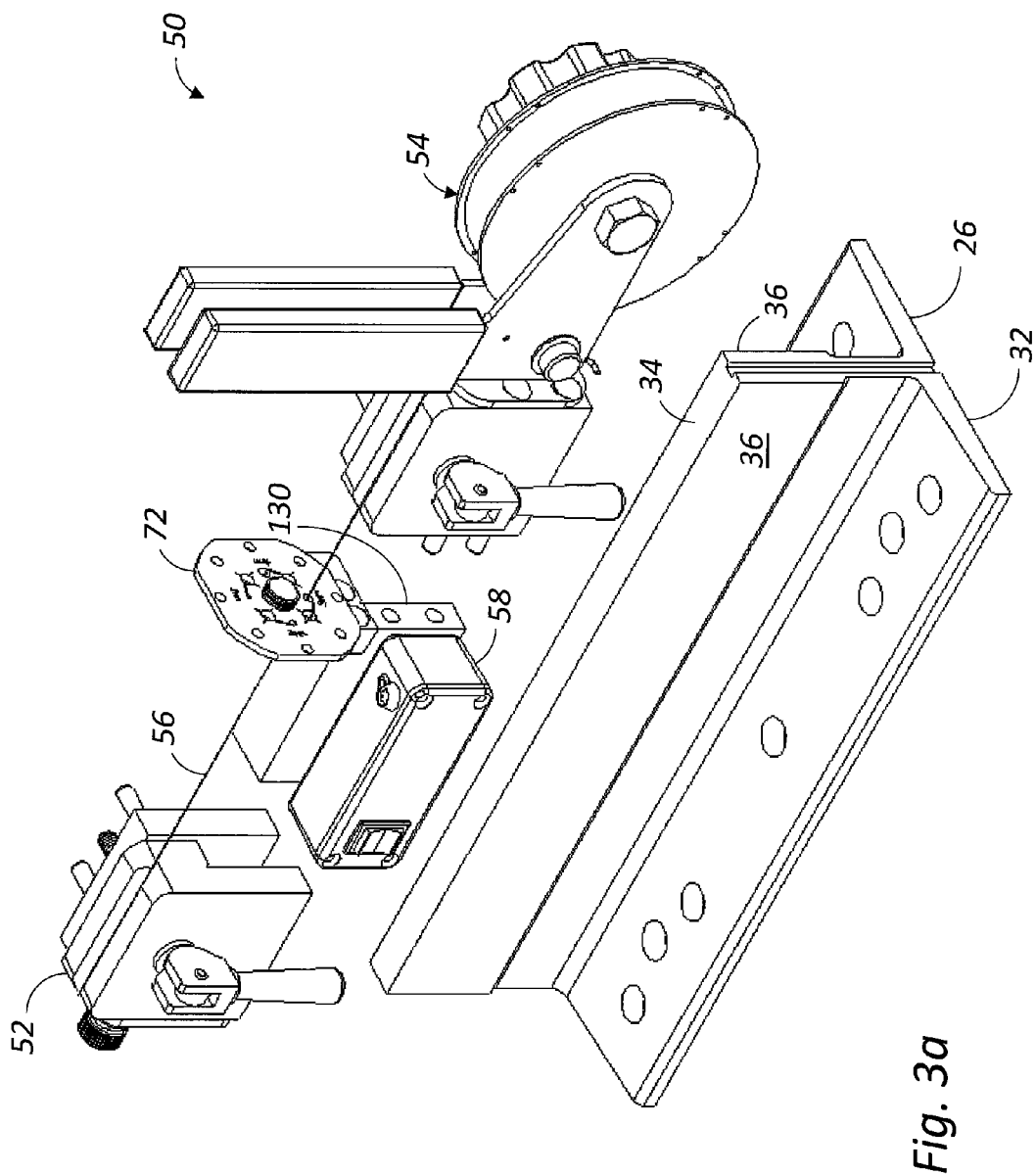
FIG. 3a is a perspective exploded view, of the conventional car guide rail element of FIG. 2 equipped with a guide rail straightness tester.
Figure 3B:
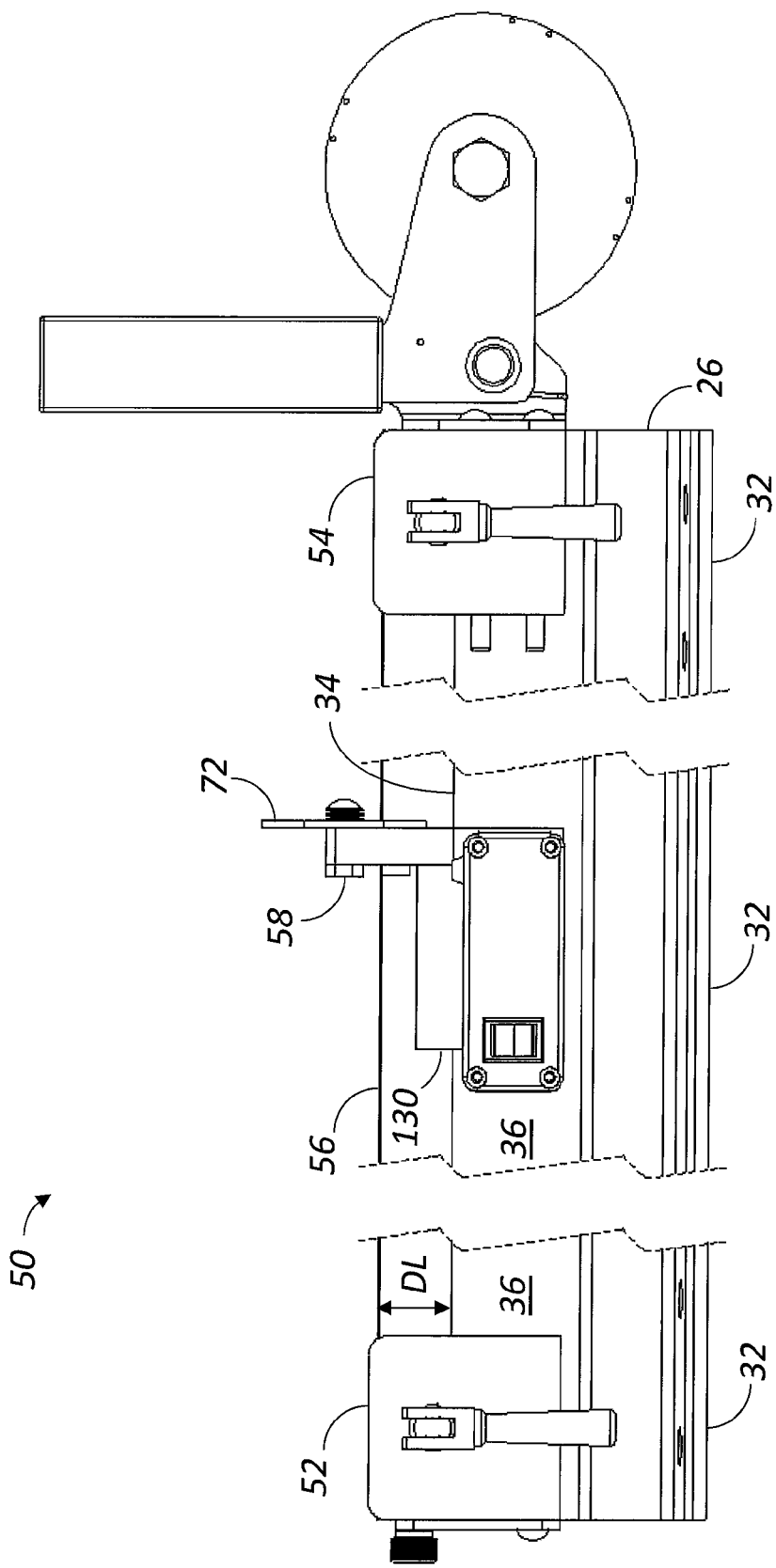

Referring now to FIGS. 3a and 3b, a guide rail straightness tester (hereafter "tester") is illustrated generally at 50. FIG. 3a illustrates the tester 50 spaced apart from an element 26 and FIG. 3b illustrates the tester 50 connected to the element 26. As discussed above, the element 26 includes the base 32, front face 34 and opposing side faces 36. The tester 50 includes a first rail clamp assembly 52, a second rail clamp assembly 54, a line 56 and a sensor assembly 58. Generally, the first and second rail clamp assemblies 52, 54 are mounted to the element 26. The sensor assembly is positioned on the face 34 of the element 26. The line 56 extends from the first rail clamp assembly 52, through a sensor plate 72 connected to the sensor assembly 58, to the second rail clamp assembly 54 and is arranged to be parallel to the face 34 of the element 26.

Figure 4:
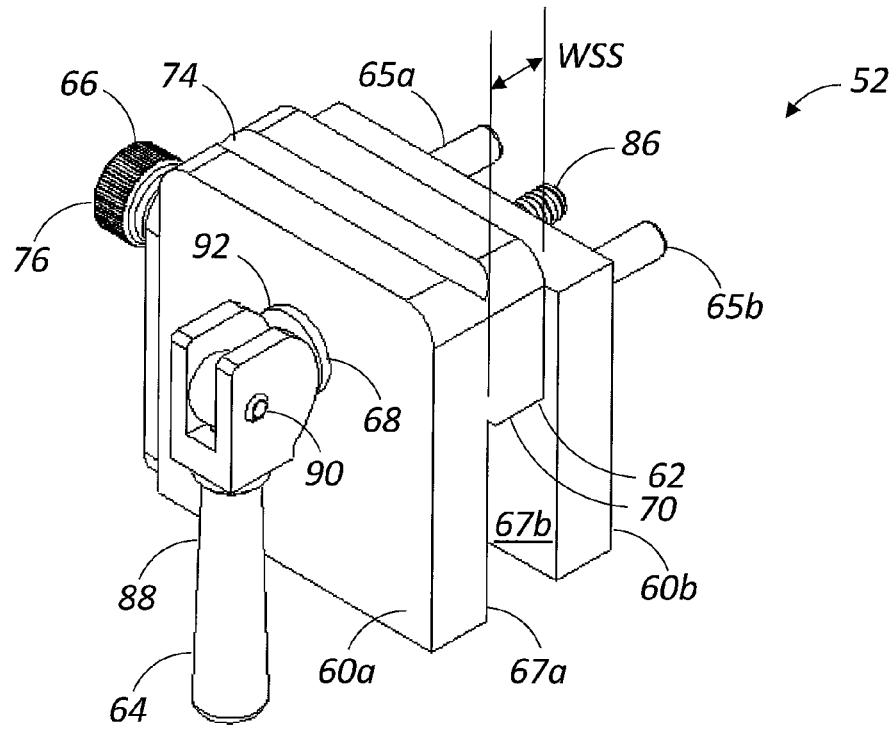

Referring now to FIG. 4, the first rail clamp assembly 52 is illustrated. The first clamp assembly 52 includes opposing plates 60a, 60b, a spacer segment 62, a clamping assembly 64 and a line fastening assembly 66. The opposing plates 60a, 60b include interior surfaces 67a, 67b configured for contact with the opposing sides faces 36 of the element 26.

Plate 60a includes a clearance aperture 68 and plate 60b includes a threaded aperture (not shown). The clearance aperture 68 in plate 60a and the threaded aperture in plate 60b are aligned such as to receive portions of the clamping assembly 64.

Referring again to FIG. 4, the spacer segment 62 is positioned between the opposing plates 60a, 60b and has a width WSS that approximates the width of the element 26 across a transverse portion of the face 34. In the illustrated embodiment, the spacer segment 62 is formed as an extension from the plate 60a. However, in other embodiments, the spacer segment 62 can be formed as a discrete element. The spacer segment 62 includes an interior surface 70 configured to be substantially parallel to the longitudinal direction of the face 34 of the element 26. The spacer segment 62 also includes an aperture (not shown) configured to align with the apertures 68 in the opposing plates 60a, 60b and further configured to receive portions of the clamping assembly 64.

Referring again to FIG. 4, optionally the spacer segment 62 can include a plurality of fixtures 65a, 65b positioned to extend through apertures (not shown) in the plate 60b. The fixtures 65a, 65b are configured to align the plates 60a, 60b such that the interior surface 70 of the spacer segment 62 seats flush with the face 34 of the element 26. In the illustrated embodiment, the fixtures 65a, 65b are formed from metallic rod material. However, the fixtures 65a, 65b can be formed from any desired material and can have any desired structure, sufficient to align the plates 60a, 60b such that the interior surface 70 of the spacer segment 62 seats flush with the face 34 of the element 26.

Optionally, the spacer segment 62 can include a recess 74 extending along an upper surface 76. The recess 74 is configured to guide the line 56 along the element 26. In the illustrated embodiment, the recess 74 has a "V" cross-sectional shape. However, in other embodiments, the recess 74 can have other desired cross-sectional shapes sufficient to guide the line 56 along the element 26.

Referring again to FIG. 4, the line fastening assembly 66 is configured to secure the line 56 as the line 56 is tensioned by the second rail clamp assembly 54. In the illustrated embodiment, the line fastening assembly 66 includes a threaded shaft (not shown) threadably fastened to the spacer segment 62 and configured to receive the line 56. A knob 76 having a threaded aperture (not shown) is configured to secure the line 56 to the first rail clamp assembly 52. However, it should be appreciated that in other embodiments, other structures, mechanisms and devices can be used to secure the line 56 as the line 56 is tensioned by the second rail clamp assembly 54, including the non-limiting examples of clips and clamps.

Referring again to FIG. 4, the clamping assembly 64 includes a threaded member 86 rotatably connected to a handle assembly 88. The threaded member 86 extends through the clearance aperture 68 in plate 60a and engages the threaded aperture (not shown) in plate 60b. Optionally, the threaded member 86 can have an aggressive lead, such as for example a double or triple start, to facilitate fast positioning of the first rail clamp assembly 52.

The handle 88 is configured to rotate about the threaded member 86 at pivot pin 90. The handle 88 further includes a plurality of cam surfaces 92. In operation, the first rail clamp assembly 52 is attached to the element 26 with the following steps. First, the interior surface 70 of the spacer segment is seated flush against the face 34 of the element 26. Next, the handle assembly 88 is rotated to advance the threaded member 86. Advancing the threaded member 86 urges the plates 60a, 60b into contact with the side faces 36 of the element 26. Finally, the handle assembly 88 is rotated about pivot pin 90 such that the cams 92 engage the plate 60a and fix the first rail clamp assembly against the element 26.

Figure 5:
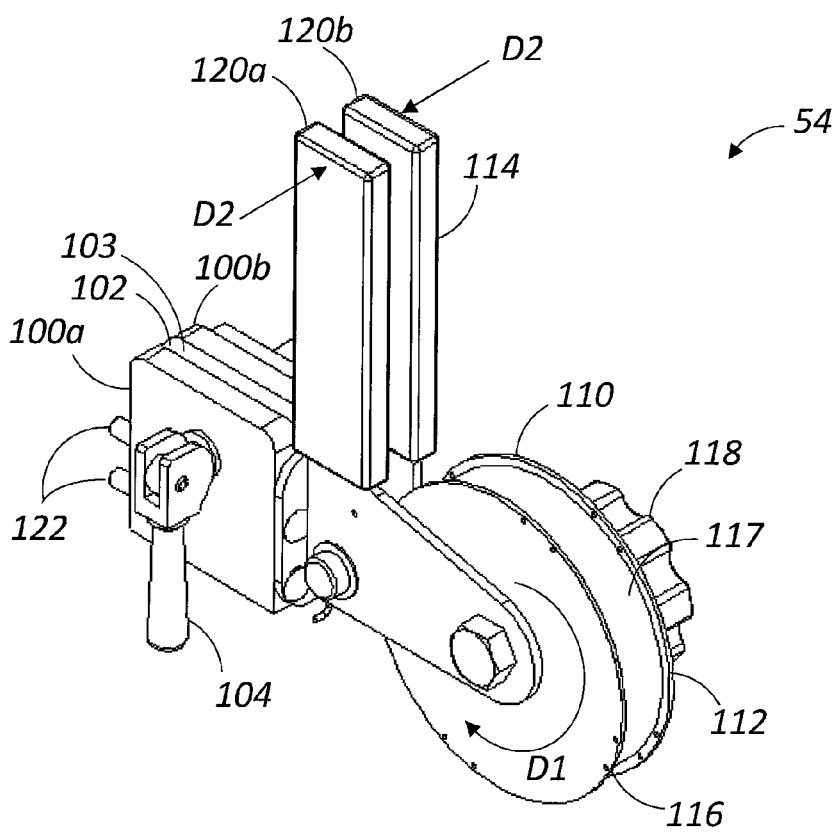

Referring now to FIG. 5, the second rail clamp assembly 54 is illustrated. The second rail clamp assembly 54 includes opposing plates 100a, 100b, spacer segment 102 and clamping assembly 104. In the illustrated embodiment, the plates 100a, 100b, spacer segment 102 and clamping assembly 104 are the same as, or similar to, the plates 60a, 60b, spacer segment 62 and clamping assembly 64 described above and illustrated in FIG. 4. However, in other embodiments, the plates 100a, 100b, spacer segment 102 and clamping assembly 104 can be different than the plates 60a, 60b, spacer segment 62 and clamping assembly 64. The spacer segment 102 includes an optional recess 103. The recess 103 is configured to guide the line 56 along the element 26. In the illustrated embodiment, the recess 103 has a "V" cross-sectional shape. However, in other embodiments, the recess 103 can have other desired cross-sectional shapes sufficient to guide the line 56 along the element 26. The second rail clamp assembly 54 is fastened to the element 26 in the same manner as described above for the first rail clamp assembly 52.

Referring again to FIG. 5, the second rail clamp assembly 54 includes a line tensioning assembly 110 extending from the plate 100a. The line tensioning assembly 110 is configured to take up excess line 56, maintain a desired tension in the line 56 and release tension in the line 56 when desired. The line tensioning assembly 110 includes a reel assembly 112 and a handle assembly 114. The reel assembly 112 is configured to take up or pay out line 56 as desired and maintain tension in the line 56. The reel assembly 112 includes a reel 116 and an actuator 118 attached thereto. The reel 116 includes a circumferential cavity 117 configured to accumulate excess line 56. In the illustrated embodiment, the reel 116 is spring-loaded, such as to provide a rotational tensioning force indicated by direction arrow D1 on the line 56. However, it should be appreciated that in other embodiments the reel 116 can have other structures and mechanisms configured to take up or pay out line 56 as desired and maintain tension in the line 56. The actuator 118 is configured to urge the reel 116 to move in the take-up direction D1. In the illustrated embodiment, the actuator 118 is a knob. Alternatively, the actuator 118 can be any structure, mechanism or device, including the non-limiting example of a motor-driven device, sufficient to urge the reel 116 to move in the take-up direction D1.

Referring again to FIG. 5, the handle assembly 114 is connected to the reel assembly 112 and is configured to release tension in the line 56 by releasing the rotational force caused by the reel 116. In the illustrated embodiment, the handle assembly 114 includes a plurality of spaced apart handles 120a, 120b. The spaced apart handles 120a, 120b are connected to the reel 116 in a manner such that urging the handles 120a, 120b together, as shown by direction arrows D2, releases the tension in the line 56 and releasing the handle 120a, 120b allows the reel to reestablish tension in the line 56. As will be described in more detail below, it is desirable to release tension in the line 56 when moving the tester 50 from one element 26 to another element 26.

Referring again to FIG. 5, the second rail clamp assembly 54 includes a plurality of fixtures 122 extending from the plate 100a. As will be described in more detail below, the fixtures 122 are configured to allow the second rail clamp assembly 54 to dock with the sensor assembly 58, thereby facilitating movement of the docked second rail clamp assembly 54 and the sensor assembly 58 to another element 26.

Figure 6:
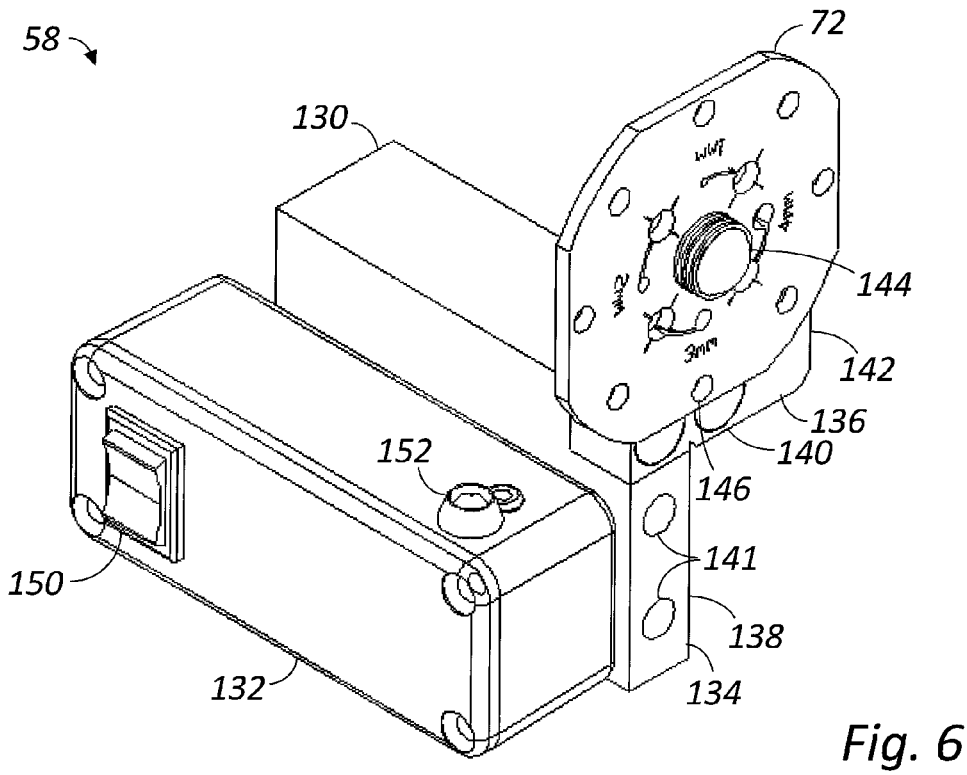

Referring now to FIG. 6, the sensor assembly 58 is illustrated. The sensor assembly 58 is configured to slidably seat on the element 26. The sensor assembly 58 includes a carriage 130, a control assembly 132 and the sensor plate 72. The carriage 130 includes a first segment 134 connected to a second segment 136. The first segment 134 includes an interior surface 138 and the second segment 136 includes an interior surface 140. The interior surface 138 of the first segment 134 is configured to seat against a side face 36 of the element 26 and the interior surface 140 of the second segment 136 is configured to seat against the front face 34 of the element 26. In the illustrated embodiment, the interior surfaces 138, 140 have a perpendicular orientation to each other. However, in other embodiments, the interior surfaces 138, 140 can have other relative orientations, sufficient that the interior surfaces 138, 140 can seat against a side face 36 and the front face 34 of the element.

Referring again to FIG. 6, optionally one or more magnets (not shown) can be positioned adjacent to the interior surfaces 138, 140 of the first and second segments 134, 136. The magnets are configured to temporarily hold the sensor assembly 58 against the front and side faces 34, 36 of the element 26 as the sensor assembly 58 slidably seats on the element 26. The magnets can any desired shape, size and strength sufficient to temporarily hold the sensor assembly 58 against the front and side faces 34, 36 of the element 26 as the sensor assembly 58 slidably seats on the element 26. In certain embodiments, the magnets are arranged such that an outer surfaces of the magnets have a flush orientation with the interior surfaces 138, 140 of the first and second segments 134, 136, although such is not necessary. In still other embodiments, the interior surfaces 138, 140 and/or the first and second segments 134, 136 can have other structures, mechanisms and devices sufficient to temporarily hold the sensor assembly 58 against the front and side faces 34, 36 of the element 26 as the sensor assembly 58 slidably seats on the element 26.

Referring again to FIG. 6, a mounting segment 142 is connected to and extends from the carriage 130. The mounting segment 142 is configured to rotatably support the sensor plate 72. The mounting segment 142 can have any desired structure sufficient to rotatably support the sensor plate 72. The mounting segment 142 includes a threaded hub 144 configured to receive and secure the sensor plate 72. It should be appreciated that in other embodiments, the hub 144 can have other structures or mechanisms sufficient to receive and secure the sensor plate 72. The mounting segment 142 also includes a positioning nub 146. The positioning nub 146 is configured to seat against apertures in the sensor plate 72 such that the sensor plate 72 has a desired orientation, as will be explained in more detail below.

Referring again to FIG. 6, the carriage 130 includes a plurality of passages 141 configured to receive and mate with the fixtures 122 extending from the second rail clamp assembly 54. As discussed above, the mated fixtures 122 and the passages 141 are configured to allow the second rail clamp assembly 54 to dock with the sensor assembly 58, thereby facilitating movement of the docked second rail clamp assembly 54 and the sensor assembly 58 to another element 26. In the illustrated embodiment, the fixtures 122 and the passages 141 have a circular cross-sectional shape and similar diameters. Alternatively, the fixtures 122 and the passages 141 can have other cross-sectional shapes and similar sizes sufficient to allow the second rail clamp assembly 54 to dock with the sensor assembly 58, thereby facilitating movement of the docked second rail clamp assembly 54 and the sensor assembly 58 to another element 26.

Referring again to FIG. 6, the control assembly 132 is fixed to the carriage 130 and includes circuitry (not shown) and a power source (not shown). The circuitry and the power source are configured to provide an electrical means of indicating if an element 26 is within a certain straightness specification. The control assembly 132 includes an on/off switch 150 and one or more indicators 152. The on/off switch 150 is configured to energize or de-energize the control assembly 132 and can be any desired mechanism or device sufficient to energize or de-energize the control assembly 132. The indicator 152 is configured to provide visual and/or audio notification of an element being outside of a certain straightness specification. In the illustrated embodiment, the indicator 152 is an LED-style light. However, in other embodiments, the indicator 152 can have other forms, including the non-limiting examples of buzzers and flashing lights or any combination thereof. The control assembly 132 will be discussed in more detail below.

Figure 7:
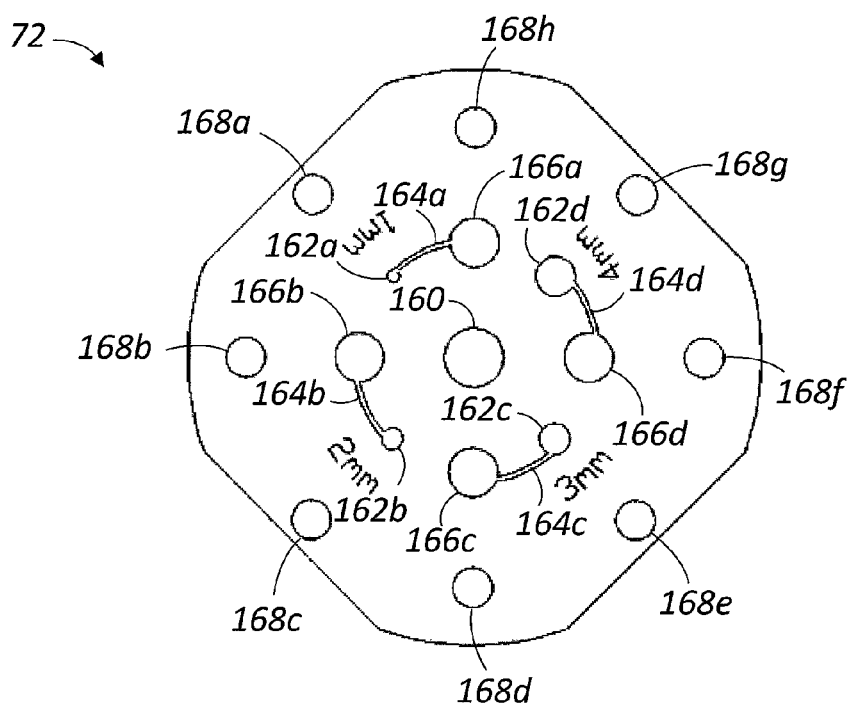
FIG. 7 is a front view, in elevation, of a sensor plate of the sensor assembly of FIG. 6.

Referring now to FIG. 7, the sensor plate 72 includes an aperture 160 configured to allow the sensor plate 72 to rotatably mount to the hub 144 of the mounting segment 142 of the sensor assembly 58. The sensor plate 72 also includes a plurality of specification apertures 162a-162d. The specification apertures 162a-162d are configured to allow the line 56 to pass through the sensor assembly 58 as the sensor assembly 58 is moved along the length of the element 25. Each of the specification apertures 162a-162d has a circular cross-sectional shape and a diameter that differs from adjacent specification apertures. For example, in the illustrated embodiment, the specification aperture 162a has a diameter of 1.0 mm, the specification aperture 162b has a diameter of 2.0 min, the specification aperture 162c has a diameter of 3.0 mm and the specification aperture 162d has a diameter of 4.0 mm. Accordingly, the various specification apertures 162a-162d can used to determine different straightness tolerances of the element 26.

Referring again to FIG. 7, a slot 164a extends from the specification aperture 162a to a quadrant aperture 166a. Similarly, a slot 164b extends from the specification aperture 162b to a quadrant aperture 166b, a slot 164c extends from the specification aperture 162c to a quadrant aperture 166c and a slot 164d extends from the specification aperture 162d to a quadrant aperture 166d. The slots 164a-164d are configured to allow passage of the line 56 to the corresponding quadrant aperture 166a-166d for further analysis of the straightness of the element 26.

Referring again to FIG. 7, the sensor plate 72 includes a plurality of position apertures 168a-168h located in a circular pattern approximate an outer edge of the sensor plate 72. The position apertures 168a-168h are configured to seat with the positioning nub 146 such that the sensor plate 72 is maintained in a desired orientation. Position aperture 168a is radially aligned with specification aperture 162a, position aperture 168b is radially aligned with quadrant aperture 166b, position aperture 168c is radially aligned with specification aperture 162b, position aperture 168d is radially aligned with quadrant aperture 166c, position aperture 168e is radially aligned with specification aperture 162c, position aperture 168f is radially aligned with quadrant aperture 166d, position aperture 168g is radially aligned with specification aperture 162d and position aperture 168h is radially aligned with quadrant aperture 166a.

Referring again to FIGS. 3a and 3b, operation of the tester 50 will now be described. In an initial step, the first rail clamp assembly 52 is attached to the element 26 as described above. Next, the second rail clamp assembly 54 is attached to the element 26 as described above. Next, the sensor assembly 58 is located relative to the element, between the first and second rail clamp assemblies 52, 54 such that the carriage 130 seats against a side face 36 and the front face 34 of the element 26. In a next step, the line 56 is attached to the first and second rail clamp assemblies 52, 54 and also fed through the desired specification aperture 162a-162d located on the sensor plate 72. In an installed position, the line 56 is positioned a distance DL from the front face 34 of the element 26. In the illustrated embodiment, the distance DL is in a range of from about 0.1 inches to about 0.5 inches. However, in other embodiments, the distance DL can be less than about 0.1 inches or more than about 0.5 inches.

In another step, the control assembly 58 is activated using the on/off switch 150. The tester 50 is electrically wired such that activating the control assembly 150 provides an electrical potential between the line 56 and the circumferential edge of the various specification apertures 162a-162d.

Referring again to FIGS. 3a, 3b, the carriage 130 is then moved along the front face 34 of the element 26 between the first and second rail clamp assemblies 52, 54. In the event the circumferential edge of one of the specification apertures 162a-162d makes contact with the line 56, the indicator 152 provides indication of the contact, thereby providing notification that the element 26 is out of the selected straightness tolerance. Conversely, in the event the circumferential edge of one of the specification apertures 162a-162d does not make contact with the line 56, the indicator 152 will not be activated, indicating that the element 26 is within the selected straightness tolerance.

Referring again to FIG. 7 and as discussed above, the differing diameters of the specification apertures 162a-162d advantageously and easily allow the selection of differing straightness tolerances. As a first example, specification aperture 162a can be configured for a warp value not to exceed a range of about 0.25 millimeters to about 0.40 millimeters along a longitudinal distance of about 1.0 meter and a twist value not to exceed a range of from about 20.0 minutes (⅓ of a rotational degree) to about 40.0 minutes (⅔ of a rotational degree) along a longitudinal distance of about 1.0 meter. As a second example, aperture 162b can be configured for a warp value not to exceed a range of about 0.15 millimeters to about 0.25 millimeters along a longitudinal distance of about 1.0 meter and a twist value not to exceed a range of from about 10.0 minutes (● of a rotational degree) to about 20.0 minutes (⅓ of a rotational degree) along a longitudinal distance of about 1.0 meter. As another non-limiting example, aperture 162c can be configured for a warp value not to exceed a range of about 0.05 millimeters to about 0.15 millimeters along a longitudinal distance of about 1.0 meter and a twist value not to exceed a range of from about 5 minutes (1/12 of a rotational degree) to about 15.0 minutes (¼ of a rotational degree) along a longitudinal distance of about 1.0 meter. While the examples provided above illustrate specific tolerance ranges, in other embodiments the tolerance ranges may be different.

Figure 8A:
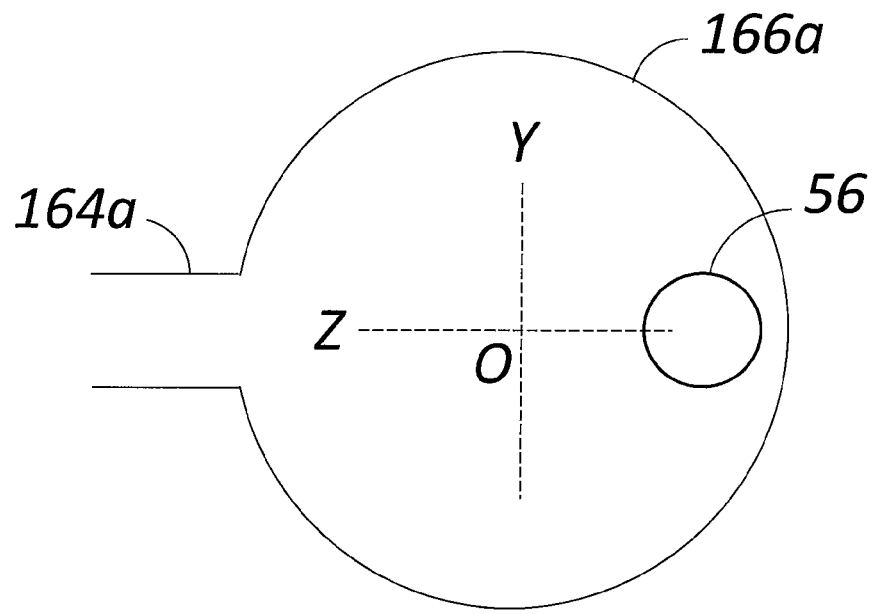
FIG. 8a is a front view, in elevation, of a quadrant aperture of the sensor plate of FIG. 7, illustrating a first position of a line.
Figure 8B:
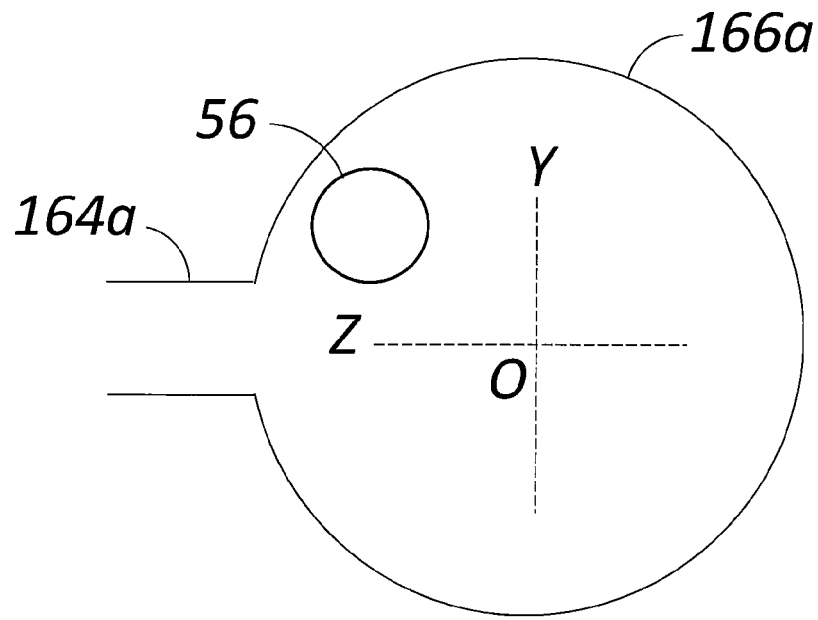
FIG. 8b is a front view, in elevation, of a quadrant aperture of the sensor plate of FIG. 7, illustrating another position of a line.

Referring again to FIG. 7, in the event the circumferential edge of one of the specification apertures 162a-162d makes contact with the line 56 thereby indicating an out of tolerance scenario, the sensor plate 72 can be rotated about the hub 160 such that the line 56 passes through a slot 164a-164d and is positioned within one of the quadrant apertures 166a-166d, as shown in FIGS. 8a, 8b. The sensor plate 72 is maintained in the rotated positioned as an associated position aperture 168a-168h is seated with the positioning nub 146.

Referring now to FIG. 8a, the line 56 is shown within the position aperture 166a. The position of the line 56 relative to the position aperture 166a provides additional information about the nature of the out of tolerance circumstance. In the embodiment illustrated in FIG. 8a, the line 56 is positioned in a spaced location from an "Y" and "Z" axis intersection, indicated by the reference character "O" and substantially on a "Z" axis. The line 56 has substantially no deviation in the "Y" direction. Accordingly, it can be determined that the element 26 is warped in the "Z" direction and the spaced apart distance from the "Y" and "Z" axis intersection "O" provides a relative amount of the warp.

Referring now to FIG. 8b, another out of tolerance circumstance is illustrated. In this embodiment, the line 56 has deviations in the "Y" direction and the "Z" direction. Accordingly, it can be determined that the element 26 is warped in both the "Y" and "Z" directions. It can be further determined that the spaced apart distance from the "Y" and "Z" axis intersection "O" provides a relative amount of the warp.

Advantageously, the tester 50 allows a fast, easy and accurate apparatus and method to determine if an individual guide rail element meets certain straightness specifications. The guide rail straightness tester 50 can be adapted for use on "T" shaped guide rails of varying sizes. It is within the contemplation of the invention that the guide rail straightness tester 50 also has application to the "T" shaped guide rails used for the counterweight.

While the guide rail straightness tester has been described above for application to elevator guide rail elements, it is within the contemplation of the invention that the guide rail straightness tester can be used on other types of straight guide rails. Non-limiting examples of other applications of straight guide rail elements include cranes, railroads, conveyors and the like.

Figure 9:
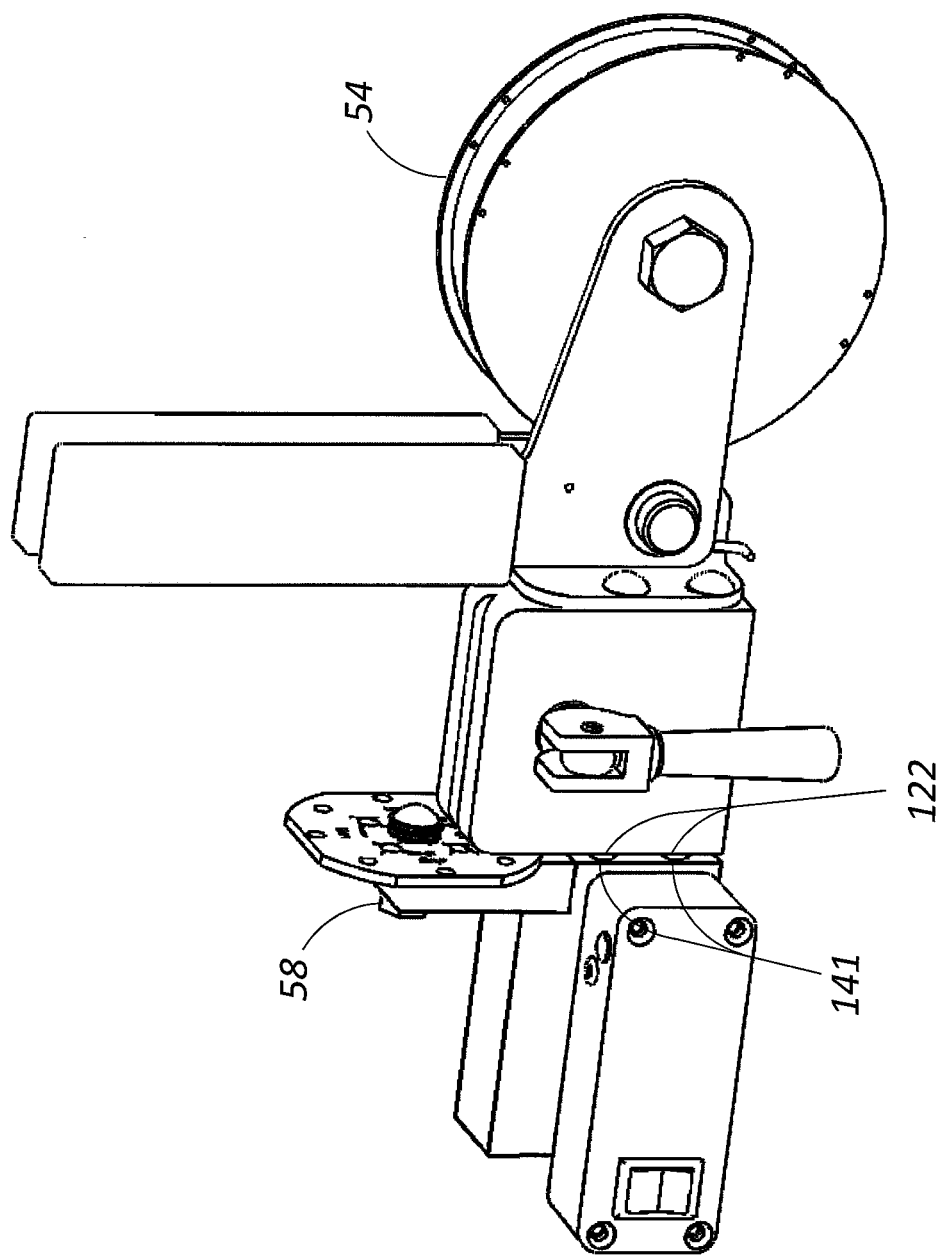
FIG. 9 is a perspective view of the second rail clamp assembly of FIG. 5 shown in a docked position with the sensor assembly of FIG. 6.

Referring now to FIG. 9, another feature of the tester 50 is illustrated. As explained above, in a testing scenario the first and second rail clamp assemblies 52, 54 are attached to an element 26 and the sensor assembly 58 is seated on the element 26 between the first and second rail clamp assemblies 52, 54. The line 56 is connected to the first and second rail clamp assemblies 52, 54 and extends through the sensor assembly 58. In the event the testing for that element 26 is completed, it can be desired to test another element. In that scenario, a quick and efficient method of moving the first and second rail clamp assemblies 52, 54, sensor assembly 58 and the line 56 to another element is desired without disassembling the line 56 from the first and second rail clamp assemblies 52, 54 and the sensor assembly 58. As also discussed above, the second rail clamp assembly 54 includes a plurality of fixtures 122 extending from the plate 100a. The fixtures 122 are configured to allow the second rail clamp assembly 54 to dock with the passages 141 located in the first segment 134 of the sensor assembly 58. The docked second rail clamp assembly 54 and sensor assembly 58 is illustrated in FIG. 9.

The method of moving the docked second rail clamp assembly 54 and sensor assembly 58 is now described. In a first step with the line 56 still connected to the first and second rail clamp assemblies 52, 54 and extending through the sensor assembly 58, the first rail clamp assembly 52 is removed from the element 26. In a next step, the docked second rail clamp assembly 54 and sensor assembly 58 are removed from the element. The first rail clamp assembly 52 and the docked second rail clamp assembly 54 and sensor assembly 58 are moved proximate the element to be tested. Next, the first rail clamp assembly 52 is attached to the new element 26. In a next step, the docked second rail clamp assembly 54 and sensor assembly 58 are attached to the new element 26. Finally, the sensor assembly 58 is undocked from the second rail clamp assembly 54. With this method, advantageously the line 56 is not removed from the first and second rail clamp assemblies 52, 54 nor the sensor assembly 58, thereby providing a quick and efficient method of moving the tester to another element.

Referring again to FIG. 9, optionally one or more magnets (not shown) can be used to temporarily hold the sensor assembly 58 against the second rail clamp assembly 54 as the docked second rail clamp assembly 54 and sensor assembly 58 are moved to another element to be tested. In certain embodiments, the magnets can be positioned adjacent to the plates 100a, 100b and/or the spacer segment 102 of the second rail clamp assembly 54. In other embodiments, the magnets can be positioned adjacent to the first and second segments 134, 136 of the sensor assembly 58. In still other embodiments, magnets can be positioned on both the second rail clamp assembly 54 and the sensor element 58. The magnets can any desired shape, size, strength and orientation sufficient to temporarily hold the sensor assembly 58 against the second rail clamp assembly 54 as the docked second rail clamp assembly 54 and sensor assembly 58 are moved to another element to be tested. In further embodiments, the second rail clamp assembly 54 and/or the sensor assembly 58 can have other structures, mechanisms and devices sufficient to temporarily hold the sensor assembly 58 against the second rail clamp assembly 54 as the docked second rail clamp assembly 54 and sensor assembly 58 are moved to another element to be tested.

Referring again to FIG. 9, in yet another embodiment, it is within the contemplation of the guide rail straightness tester that the fixtures 122 can be magnetized, sufficient to temporarily hold the sensor assembly 58 against the second rail clamp assembly 54 as the docked second rail clamp assembly 54 and sensor assembly 58 are moved to another element to be tested.

The principle and mode of operation of the guide rail straightness tester have been described in certain embodiments. However, it should be noted that the guide rail straightness tester may be practiced otherwise than as specifically illustrated and described without departing from its scope.

What is claimed is:

1. A guide rail straightness tester comprising:
a first rail clamp assembly attached to a guide rail;
an opposing second rail clamp assembly attached to the guide rail;
a sensor assembly positioned between the first and second rail clamp assemblies and configured for slidable seating on the guide rail, the sensor assembly including a sensor plate; and
a line extending from the first rail clamp assembly through an aperture in the sensor plate and connected to the second rail clamp assembly;
wherein the sensor assembly is configured to determine the straightness of the guide rail during movement of the sensor assembly along the guide rail.

2. The guide rail straightness tester of claim 1, wherein the sensor plate includes a plurality of specification apertures ranging in size from 1.0 mm to 4.0 mm.

3. The guide rail straightness tester of claim 2, wherein the sensor plate is configured for rotation to access the plurality of specification apertures.

4. The guide rail straightness tester of claim 3, wherein the quadrant apertures are configured to determine the nature of a warp.

5. The guide rail straightness tester of claim 1, wherein a slot connects each of the specification apertures with a quadrant aperture.

6. The guide rail straightness tester of claim 1, wherein the sensor plate and the line have an electrical potential.

7. The guide rail straightness tester of claim 6, wherein completing the electrical potential actuates an indicator.

8. The method of claim 1, including the step of forming an electrical potential between the sensor plate and the line.

9. A guide rail straightness tester comprising:
a first rail clamp assembly attached to a guide rail;
an opposing second rail clamp assembly attached to the guide rail;
a sensor assembly positioned between the first and second rail clamp assemblies and configured for slidable seating on the guide rail; and
a line extending from the first rail clamp assembly through an aperture in the sensor assembly and connected to the second rail clamp assembly;
wherein the second rail clamp assembly and the sensor assembly can be docked together to facilitate relocation from the guide rail to a different guide rail.

10. The guide rail straightness tester of claim 9, wherein the second rail clamp assembly includes fixtures extending from a plate configured to be received by passages in the sensor assembly.

11. The guide rail straightness tester of claim 10, wherein the fixtures have a circular cross-sectional shape.

12. The guide rail straightness tester of claim 9, wherein the docked second rail clamp assembly and the sensor assembly and can be relocated to a different guide rail with the line still connected to the first rail clamp assembly.

13. The guide rail straightness tester of claim 9, wherein the sensor plate includes a plurality of specification apertures ranging in size from 1.0 mm to 4.0 mm.

14. The guide rail straightness tester of claim 13, wherein a slot connects each of the specification apertures with a quadrant aperture.

15. The guide rail straightness tester of claim 14, wherein the quadrant apertures are configured to determine the nature of a warp.

16. A method of using a guide rail straightness tester, the method comprising the steps of:
attaching a first rail clamp assembly to a guide rail;
attaching an opposing second rail clamp assembly to the guide rail;
positioning a sensor assembly between the first and second rail clamp assemblies, the sensor assembly configured for slidable seating on the guide rail, the sensor assembly including a sensor plate; and
extending a line from the first rail clamp assembly through an aperture in the sensor plate and connecting the line to the second rail clamp assembly;
wherein the sensor assembly is configured to determine the straightness of the guide rail during movement of the sensor assembly along the guide rail.

17. The method of claim 16, including the step of selecting a specification aperture from a plurality of specification apertures ranging in size from 1.0 mm to 4.0 mm.

18. The method of claim 17, including the step of rotating the sensor plate to the selected specification aperture.

19. The method of claim 18, including the step of rotating the sensor plate from the selected specification aperture through a slot to a quadrant aperture.

20. The method of claim 19, including the step of determining the nature of a warp of the line from a relative positioning of the line within the quadrant aperture.

* * * * *